Nov. 6, 1962    H. L. TATE    3,062,183
ANIMAL MOVEMENT CONTROLLING APPARATUS
Filed Oct. 10, 1957    2 Sheets-Sheet 1
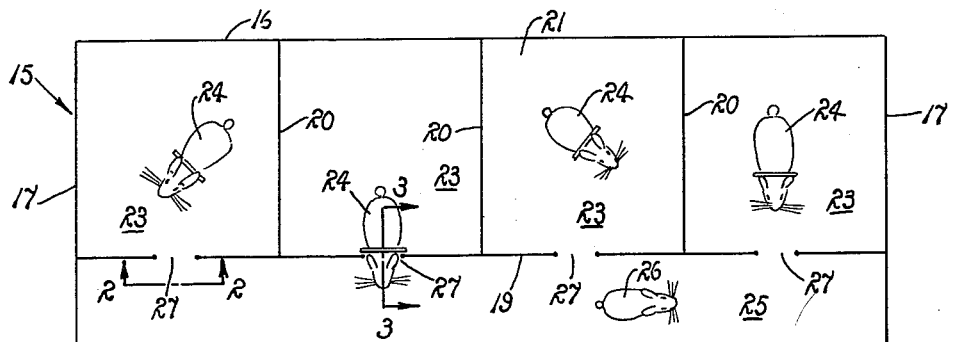
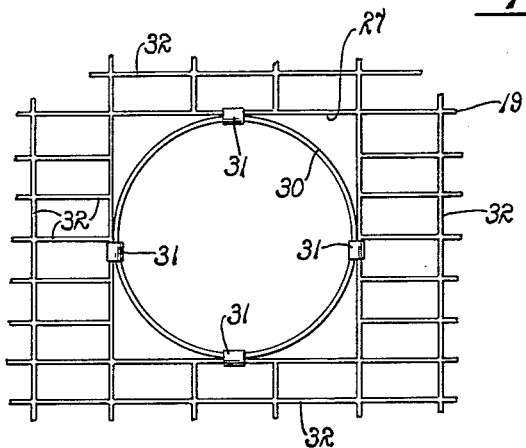
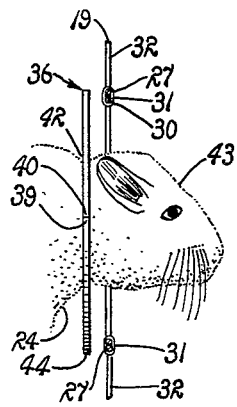
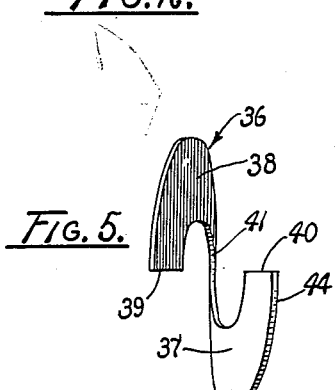
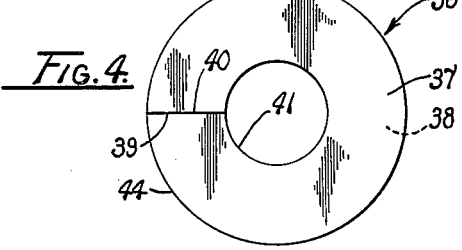
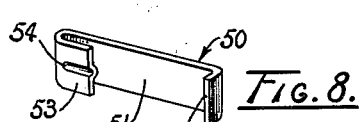
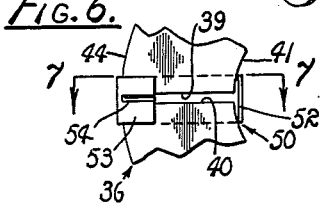
HERBERT L. TATE
INVENTOR
HUEBNER, BEEHLER & WORREL
ATTORNEYS
BY Richard M. Worrel Nov. 6, 1962 H. L. TATE 3,062,183
ANIMAL MOVEMENT CONTROLLING APPARATUS
Filed Oct. 10, 1957 2 Sheets-Sheet 2

HERBERT L. TATE
INVENTOR
HUEBNER, BEEHLER & WORREL
ATTORNEYS

United States Patent Office 3,062,183
Patented Nov. 6, 1962

3,062,183
ANIMAL MOVEMENT CONTROLLING
APPARATUS
Herbert L. Tate, 1309 West Terrace, Fresno, Calif.
Filed Oct. 10, 1957, Ser. No. 689,361
18 Claims. (Cl. 119—15)

The present invention relates to apparatus for controlling the movements of animals and more particularly to such an apparatus adapted to segregate selected animals into individual predetermined areas of movement while permitting other selected animals to move at will through said areas.

Successful breeding is one of the most important phases of raising chinchillas. Although it was once believed that chinchillas were monogamous, it has been discovered through recent experiments that excellent results can be obtained by polygamous breeding carried on under carefully controlled conditions. Polygamous breeding offers the possibility of selective mating of a top male with the best females at the peaks of their mating seasons thereby raising the standard of the animals.

Because polygamous breeding offers dangers to the animals as a result of fighting, it has not been accepted by many chinchilla growers. The female chinchilla is known to be possessive and aggressive. Further, chinchillas are known to fight during courtship and frequently, after the litter is born, the female may attack the male as a result of his advances. Because the female has the weight and size advantage and is known to "boss" the male, the latter often gets the worst of any fight.

In the past "refuge boxes" have been installed in chinchilla cages to provide a temporary retreat for the males. These boxes are usually about fourteen inches square, six inches high and have two diagonally positioned holes therein. However, this device does not provide an absolute escape and hazard from fighting still exists. It will of course be understood that even if the female fails to kill the male and thus fails to destroy a prized breeding animal, vigorous efforts so intended by the female frequently reduce or destroy the value of the pelts for which the animals are raised.

Accordingly, it is an object of the present invention to provide an improved animal movement controlling apparatus.

Another object is to provide an apparatus for protecting one animal against attack by another animal when both animals are housed in cages while permitting one of the animals to have self determined access to the other.

Another object is to enable the effective polygamous breeding of chinchillas.

Another object is to protect male chinchillas from attack by mating female chinchillas.

Another object is to provide a cage for housing female chinchillas to which a male chinchilla can enter or leave, as desired, but from which the female chinchilla is precluded from leaving.

Another object is to provide an unobstrusive chinchilla collar.

Another object is to provide a transparent, lightweight chinchilla collar.

Another object is to provide a chew-resistant chinchilla collar.

Another object is to minimize the expense and loss heretofore involved in polygamous breeding of chinchillas.

Other objects are to provide an apparatus of the nature described which is simple to construct and use, durable in construction, dependable in operation, and which is highly effective for accomplishing its intended purposes.

These together with other objects will become more fully apparent upon reference to the following description and accompanying drawing.

In the drawing:

FIG. 1 is a diagrammatic top plan view of a cage employing the apparatus of the subject invention and showing both female and male chinchillas housed therein.

FIG. 2 is a somewhat enlarged fragmentary side view of a partition in the cage of FIG. 1 and showing an aperture ring mounted in an aperture provided in the partition.

FIG. 3 is a somewhat enlarged fragmentary vertical section taken on line 3—3 of FIG. 1 and showing part of a female chinchilla wearing a collar of the type provided by the present invention.

FIG. 4 is a face view of the collar of the present invention in closed position.

FIG. 5 is a view of the collar in open position.

FIG. 6 is a somewhat enlarged fragmentary view of the adjacent edges of the collar with a clip connected thereto.

FIG. 7 is a transverse section taken on line 7—7 of FIG. 6.

FIG. 8 is a perspective view of the clip shown in FIGS. 6 and 7.

Figure 9:
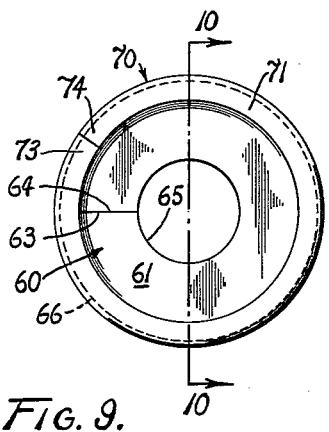
FIG. 9 is a face view of a collar having a modified type clip or rim thereon and shown in closed position.

Referring more particularly to the drawings, a chinchilla cage of latticed, open wire-mesh framework is generally indicated by the numeral 15. The cage provides a back wall 16, side walls 17 forwardly extended in parallel relation from the back wall, a front wall 18 interconnecting the side walls in parallel relation to the back wall, a longitudinally extended partition 19 interconnecting the side walls in spaced parallel relation to the front and back walls but closer to the front wall, and a plurality of substantially equally longitudinally spaced transverse partitions 20 extended between the back wall and the longitudinal partition. The cage may have a bottom wall 21, and may have a top wall, not shown, in parallel spaced relation to the bottom wall, if desired. No particular significance is to be attributed to the specific construction of the cage, it being illustrative of a cage providing a plurality of individual cells 23 adapted to hold individual female chinchillas 24 and an elongated runway 25 for a male chinchilla 26 to move to and from the individual cages. The cells are each provided with a substantially square aperture or opening 27 located in the longitudinal partition. Each aperture is sufficiently large to enable passage of a chinchilla therethrough.

Circular rings 30 are individually positioned in the apertures 27 in the partition 19. A plurality of split clamping bands 31 are fitted about each ring and the adjacent wires 32 forming part of its respective bounding portions of the partition. Again, it is to be noted that the ring is of sufficient diameter to enable movement of the chinchillas 24 and 26 therethrough. That is, the opening in the ring is larger than the maximum girth of the animals to permit their free passage through the partition or wall 19. Preferably, four bands connect each ring in its respective apertures and these bands are preferably in substantially equally spaced relation circumferentially of the ring.

An annular resiliently flexible disc type collar 36 preferably of plastic, such as plexiglass, is provided for each of the female chinchillas 24. Each collar has opposite surfaces or sides 37 and 38, separable adjacent ends 39 and 40, an inner circular edge 41 providing a neck opening having a diameter greater than the diameter of the neck 42 of the female chinchilla less than the diameter of the head of such chinchilla, as best seen in FIG. 3. The term "diameter" is utilized herein to designate "the length of a straight line through the center of an object," as defined in Webster's New International Dictionary, second edition. It is a convenient designation of the transverse dimensions of portions of the animals, of the opening and of the collar. It is not to be construed as implying or requiring a circular form but rather as a reference to certain transverse dimensions having significant relationship. For example, the transverse dimensions of the inner opening of the collar must be greater than the transverse dimensions of the neck of the animal on which it is mounted to avoid strangulation but less than the transverse dimensions of the animal's head to avoid inadvertent displacement. Similarly, the collar must have outer transverse dimensions greater than the transverse dimensions of the opening to preclude passage of the animal and its collar therethrough.

Further, each collar has an outer circular edge 44. The collar is thus split along its adjacent ends to permit separation, as indicated in FIG. 5 whereby it can be fitted over the head and onto the neck of a female chinchilla. Although plastic is preferred for its lightness and transparency, it will be evident that the collar can be constructed of metal, such as aluminum, or from glass, providing the latter is of sufficient flexibility to permit the described separation without fracture, or from any other suitable material. However, it must be borne in mind that chinchillas are prone to spend much of their time, particularly during the night time, gnawing on whatever is available. Thus material subject to easy chipping should not be used.

A clip 50 is provided for locking the adjacent ends 39 and 40 of the collar 36 together. The clip has a central portion 51 adapted for engagement with one of the surfaces 37, for example, of the collar, a short flange 52 perpendicularly extended from the central portion in engagement with the inner edge 41 of the collar, and a reversely curved outer flange 53 engaging the opposite surface 38 and outer edge 44 of the collar. The clip marginally overlaps the adjacent ends of the collar, and the reverse flange provides a detent 54 adapted to fit between the adjacent ends of the collar properly to position the clip on the collar and to retain it in position. It will be evident that by sliding the clip relatively along the collar, it can be moved between a position, such as that shown in FIG. 6, locking the ends of the collar together against separation, and a position in spaced relation, that is non-bridging relation, to the adjacent ends 39 and 40 of the collar thereby permitting separation of such ends. If preferred, the clip can easily be removed for effecting separation of the collar ends.

*Operation*

The operation of the described embodiment of the subject invention is believed to be readily apparent and is briefly summarized at this point.

With the clips 50 retracted, the collars 36 are individually fitted over the heads 43 of the female chinchillas 24. When positioned on the necks 42 of the chinchillas, as shown in FIG. 3, the clips 50 are returned to bridging relation to the adjacent ends 39 and 40 of their respective collars. Because of its transparency, light weight, and size, the collar is practically out of sight under the animals' fur, and the animals appear to be unaware of its presence. It is to be observed that the animal's fur is minimized in FIG. 3 for a better view of the collar.

The female chinchillas 24 wearing the collars 36 are individually positioned in the cells 23. A single male chinchilla 26 is placed in the runway 25. It is to be noted, however, that the male chinchilla is not provided with a collar 36 around his neck. As such, the male chinchilla can enter or leave any of the cells through their respective rings 30. However, the female chinchillas are confined to their individual cells inasmuch as the outside diameters of the collars 36 are greater than the inside diameters of the rings 30, as illustrated in FIGS. 1 and 3. Although the female chinchilla may stick her head 43 out through the ring, the engagement of the collar with the ring prevents her entering the runway in pursuit of the male chinchilla.

*Second Form*

Figure 10:
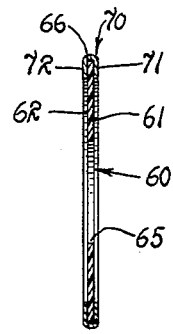
FIG. 10 is a diametrical cross section taken on line 10—10 of FIG. 9.
Figure 11:
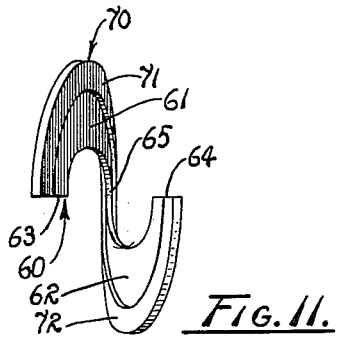
FIG. 11 is a view of the collar shown in FIG. 9 but with the adjacent ends thereof spread apart in a manner similar to FIG. 5.

A second form of collar is generally indicated by the numeral 60 in FIGS. 9, 10 and 11. The collar, as before, has opposite surfaces 61 and 62, adjacent separable ends 63 and 64, an inner circular edge 65, and an outward circular edge 66. Dimensionally, the collar is identical to the collar 36. Further, the collar is constructed of lightweight, transparent material.

A circular rim 70 of channel-shaped cross section and of chew-resistant material, such as spring steel, is fitted in circumscribing relation on the outer edge 66 of the collar 60. The rim has resiliently flexible inside and outside flanges 71 and 72 respectively engaging the opposite surfaces 61 and 62 of the collar, and separable adjacent ends 73 and 74.

The rim 70 is rotatable relative to the collar 60 so as to move the adjacent ends 73 and 74 of the rim between a position coincident with the ends 63 and 64 of the collar, as shown in FIG. 11, and positions with said ends misaligned, as shown in FIG. 9. The flanges are in frictional engagement with the opposite surfaces of the collar so as yieldably to resist such relative rotational movement. However, when the ends are coincident, the collar can be separated to permit its attachment to the neck 42 of the female chinchilla 24, or detachment therefrom. When said ends are out of said coincident relationship, the ends of the collar are locked against opening.

When the rim 70 is employed, the outer edges 66 of the collars cannot be chewed or bitten into by the chinchillas 24 or 26. This is significant inasmuch as it is known that chinchillas will readily gnaw and eat glass or plastic.

From the foregoing it will be evident that apparatus has been provided for effecting control of animal movements. The apparatus is designed primarily to prevent attack of female chinchillas on male chinchillas during mating periods. In addition, it is found that the apparatus enables the effective polygamous breeding of chinchillas principally because of the protective features described and the ready access permitted the male to each of the females. Specifically, the collar employed is of significance because of its lightness, transparency, unobtrusiveness, and resistance to chewing by the chinchillas. Although the invention has been described in connection with chinchillas, it will be evident that it has utility in connection with the control of other animals where similar problems are involved.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An animal collar for chinchillas and the like adapted to be worn on the neck of such an animal to preclude its passage through openings of predetermined size comprising an integral one-piece annular member of lightweight, transparent, resiliently flexible chew-resistant material having opposite surfaces, an outside edge circumscribing a predetermined area, an inside edge circumscribing an area smaller than said predetermined area, and opposite ends terminating in a pair of adjacent spaced end edges extended between the inner and the outer edges permitting separation of said adjacent end edges of the collar into an open position incident to application of oppositely directed forces on opposite surfaces of the collar for putting the collar on the animal's neck and for taking it off, said opposite ends being normally coplanar in a closed position and yieldably resisting movement into said open position.

2. In combination with a cage adapted to contain an animal and having a wall providing an opening therein, said opening being of a diameter larger than the contained animal; an apparatus for precluding passage of the animal through the opening comprising means connected to the cage in the opening providing a rim of a diameter larger than the contained animal; and a collar adapted to be applied to the neck of the contained animal, the collar being disc type and having a neck opening of a diameter less than that of the contained animal's head, and having an outside diameter greater than that of said rim, the collar further having a pair of adjacent releasably connected end edges movable between a closed position holding the collar on the neck of the contained animal and an open position permitting attachment and removal of the collar.

3. The combination of claim 2 wherein said rim providing means is a rigid endless annular member; and wherein the collar is of a lightweight, transparent, resiliently flexible material.

4. The combination of claim 2 wherein the rim providing means is a rigid endless annular member; wherein the collar is of a lightweight, transparent, resiliently flexible material and has opposite sides, wherein the collar has an inner circular edge circumscribing said neck opening and an outer circular edge; and wherein a clip is provided releasably marginally overlapping the adjacent end edges of the collar having a central portion engaging a side of the collar and opposite end flanges engaging the inner and outer edges of the collar, one of said flanges being reversely curved and engaging the side of the collar opposite to the side engaging said central portion, the clip holding the adjacent ends together and precluding said separation thereof but being removable to permit said separation.

5. In combination with a cage adapted to hold an animal and having an aperture therein large enough to enable passage of the animal therethrough; apparatus for precluding passage of the animal through the aperture comprising a ring connected to the cage in circumscribing relation to the aperture having an inside diameter large enough to enable passage of the animal; a collar adapted to fit on the neck of the animal in the cage of lightweight, transparent, resiliently flexible, relatively soft, plastic, chewable material having opposite surfaces, an outside edge of a diameter larger than the inside diameter of the ring, an inside edge of a diameter smaller than the head of the animal, and a pair of adjacent spaced end edges extended between the inner and the outer edges permitting separation of the adjacent ends of the collar incident to application of oppositely directed forces on opposite surfaces of the collar for putting the collar on the animal's neck and for taking it off; and an annular split channel-shaped locking rim of relatively hard chew-resistant material resiliently frictionally fitted in circumscribing relation on the outer edge of the collar having separable adjacent end edges, the rim being rotatable relative to the collar between an aligned unlocking position with the separable edges of the rim coincident with the separable edges of the collar for enabling separation of the edges of the collar and a misaligned locking position with said end edges circumferentially spaced from each other so as to preclude separation of the collar edges.

6. An apparatus for breeding a female chinchilla with a male chinchilla in which the male is protected from attack by the female comprising a cage adapted to house a female chinchilla and having a side wall providing an aperture therein, a ring connected to the side wall of the cage in the aperture and circumscribing an area sufficiently large to permit passage of chinchillas therethrough; and an annular collar having an outside circumferential edge dimensionally larger than the ring to preclude passage of the collar through the ring, an inside edge adapted to circumscribe the neck of a female chinchilla in the cage and being smaller in area than the head of the female chinchilla, and a pair of adjacent spaced end edges movable between a collar closing position in opposed relation and a collar opening position spaced farther apart than when in said collar closing position to permit attachment of the collar to the neck of the chinchilla and detachment therefrom whereby a male chinchilla can enter or leave the cage through the ring for mating purposes and whereby the female chinchilla is precluded from leaving the cage through the ring by engagement of the collar on her neck with the ring so that the male chinchilla may seek refuge out of the cage if being pursued by the female.

7. Apparatus for polygamously breeding a plurality of female chinchillas with a single male chinchilla comprising a cage of wire mesh having spaced front and rear walls interconnected by side walls, a longitudinal partition interconnecting the side walls in spaced relation to the front wall and defining an elongated runway for containing a male chinchilla, and longitudinally spaced partitions transversely interconnecting the rear wall and the longitudinal partition to define a plurality of cells individually adapted to contain female chinchillas, the longitudinal partition having a plurality of substantially rectangular apertures therein individually opening from each cell into the runway; endless circular wire rings individually fitted in the apertures each having an inside diameter larger than the largest of the contained chinchillas; circumferentially spaced bands removably circumscribing the rings and adjacent wires of the partition around the rings thereby attaching the rings to the partitions; and annular disc type collars adapted to fit on the necks of the female chinchillas of lightweight, transparent, resiliently flexible material having opposite surfaces, outer substantially circular edges of diameters individually larger than the inside diameters of the rings, inner edges of diameters individually smaller than the heads of the female chinchillas, and adjacent spaced end edges extended between their respective inner and outer edges permitting resilient separation of the adjacent ends of the collar incident to application of oppositely directed forces on opposite surfaces of the collars for attaching the collars to the female chinchillas' necks and for taking the collars off from said necks.

8. An animal collar for chinchillas and the like adapted to be worn on the neck of such an animal to preclude its passage through openings of predetermined size but otherwise adapted not to restrict activity of the chinchilla comprising an integral one-piece annular member of lightweight, transparent, resiliently flexible chew-resistant plastic having opposite surfaces, an outside edge circumscribing a predetermined area, an inside edge circumscribing an area smaller than said predetermined area, and opposite ends terminating in a pair of adjacent spaced end edges extended between the inner and the outer edges permitting separation of said adjacent end edges of the collar into an open position incident to application of oppositely directed forces on opposite surfaces of the collar for putting the collar on the animal's neck and for taking it off, said opposite ends being normally coplanar in a closed position and yieldably resisting movement into said open position; and means releasably engaging the ends of the collar for preventing separation of said ends.

9. The combination of claim 8 including a clip releasably marginally overlapping the adjacent end edges of the collar having a central portion engaging one of said surfaces of the collar and opposite end flanges engaging the inner and outer edges of the collar, one of said flanges being reversely curved and engaging the surface of the collar opposite to the surface engaging said central portion, the clip holding the adjacent ends together and precluding said separation thereof but being removable to permit said separation.

10. The combination of claim 8 including an annular split channel-shaped locking rim of relatively hard chew-resistant material resiliently frictionally fitted in circumscribing relation on the outer edge of the collar having separable adjacent end edges, the rim being rotatable relative to the collar between an aligned unlocking position with the separable edges of the rim coincident with the separable edges of the collar for enabling separation of the edges of the collar and a misaligned locking position with said end edges circumferentially spaced from each other so as to preclude separation of the collar edges.

11. Apparatus for polygamously breeding a plurality of female chinchillas with a single male chinchilla comprising a cage having spaced front and rear walls interconnected by side walls, a longitudinal partition interconnecting the side walls in spaced relation to the front wall and defining therewith an elongated runway for containing a male chinchilla, and a longitudinally spaced partition transversely interconnecting the rear wall and the longitudinal partition to define a pair of cells individually adapted to contain female chinchillas, the longitudinal partition having a plurality of apertures therein individually opening from each cell into the runway; endless rims individually connected to the longitudinal partition in circumscribing relation to the apertures therein and each having an inside diameter larger than the largest of the contained chinchillas; and annular disc type collars individually adapted to fit on the necks of the female chinchillas of lightweight, transparent flexible material, each having opposite sides, an outer diameter greater than the inside diameter of each of the rims, a neck opening of a diameter less than that of the female chinchillas' heads, and adjacent spaced opposite ends terminating in spaced end edges extended between their respective inner and outer edges permitting resilient separation of the adjacent ends of the collar incident to application of oppositely directed forces on opposite sides of the collars for attaching the collars to the female chinchillas' necks and for taking the collars off from said necks.

12. An animal cage having at least one female containing compartment and one male containing compartment, a wall between said compartments, said wall having an opening therein, said opening being of a diameter larger than the largest diameter of the contained animals, and a collar adapted to be applied to the neck of the female, the collar being disc type and having a neck opening of a diameter less than that of the female's head, and having an outside diameter greater than that of said wall opening, whereby the female is confined to her compartment and the male is permitted to run freely from one compartment to the other.

13. The combination of claim 12 wherein the collar is split thereby to provide adjacent end edges movable between a collar closing position and a collar opening position with the end edges spaced farther apart than in said collar closing position so as to facilitate attachment and removal of the collar to and from the neck of the female.

14. The combination of claim 13 including means releasably interconnecting the adjacent end edges of the collar.

15. The combination of claim 12 wherein said male compartment is an elongated runway, wherein the cage has a second female containing compartment separated from said one female containing compartment, and wherein a second wall separates the second compartment from the male containing compartment, said second wall having a second opening therein, said second opening being also of a diameter larger than the largest diameter of the contained animals.

16. An animal cage for breeding a male animal with a female animal having at least one female containing compartment, and a side wall for said compartment, said wall having an opening therein, said opening being of a diameter larger than the largest diameter of the female animal, and a collar adapted to be applied to the neck of the female, the collar being disc type and having a neck opening of a diameter less than that of the female's head, and having an outside diameter greater than that of said wall opening whereby the female is confined to her compartment and whereby the male is permitted to run freely into or out of said female containing compartment.

17. An enclosure for permitting an animal to have access to and escape from a second animal comprising
 (A) a pair of compartments adapted to contain such animals,
 (B) a wall separating the compartments
  (1) having an opening therethrough,
   (a) said opening being larger than the maximum girth of the animals which the compartments are adapted to contain for free passage of the animals therethrough, and
 (C) a substantially flat thin collar adapted to be affixed to the neck of one of the animals in circumscribing outward extension therefrom,
  (1) said collar having a minimum outside diameter greater than the maximum inside diameter of the opening in the wall
   (a) to preclude passage of the animal to which the collar is affixed through the wall.

18. An animal cage
 (A) having at least a pair of compartments each adapted to contain an animal,
 (B) a wall between said compartments,
  (1) said wall having an opening therein,
   (a) said opening being of transverse dimensions greater than the maximum transverse dimensions of the animals the compartments are adapted to contain for passage of the animals through the opening, and
 (C) a collar adapted to be applied to the neck of one of the animals
  (1) the collar being disc type and
  (2) having a neck opening of transverse dimensions less than that of the transverse dimensions of the animal's head to which the collar is applied, and
  (3) having outside transverse dimensions greater than the transverse dimensions of said wall opening.

References Cited in the file of this patent

UNITED STATES PATENTS

| | | |
|---|---|---|
| 1,723,297 | Norton | Aug. 6, 1929 |
| 2,676,566 | Krieger | Apr. 27, 1954 |
| 2,698,004 | Luther | Dec. 28, 1954 |
| 2,725,036 | Petrie | Nov. 29, 1955 |

OTHER REFERENCES

Washington Post, Washington, D.C., for Feb. 25, 1940, page 1 of Section 7.